United States Patent [19]

Pennington et al.

[11] Patent Number: 5,453,982
[45] Date of Patent: Sep. 26, 1995

[54] PACKET CONTROL PROCEDURE BETWEEN A HOST PROCESSOR AND A PERIPHERAL UNIT

[75] Inventors: Ricky J. Pennington, Eagle, Id.; Brian D. Batchelder, Portland, Oreg.; Erik Kilk, Battle Ground, Wash.; Karla Johnson, Simi Valley, Calif.

[73] Assignee: Hewlett-Packard Company, Palo Alto, Calif.

[21] Appl. No.: 298,505

[22] Filed: Aug. 29, 1994

[51] Int. Cl.$^6$ .................................................. H04L 12/40
[52] U.S. Cl. .................... 370/85.1; 370/92; 370/94.1; 395/497.01; 395/200.05; 395/830; 395/200.14
[58] Field of Search ................. 370/94.1, 85.1, 370/92, 60; 395/200, 275, 325

[56] References Cited

U.S. PATENT DOCUMENTS 4,677,616  6/1987  Franklin ........................... 370/94.1 X
5,029,164  7/1991  Goldstein et al. ................... 370/95.1
5,063,562  11/1991  Barzilai et al. ..................... 370/94.1
5,239,627  8/1993  Beck et al. ......................... 395/275
5,313,597  5/1994  Gephardt .......................... 395/325

Primary Examiner—Douglas W. Olms
Assistant Examiner—Russell W. Blum

[57] ABSTRACT

A method for controlling packet communications between a source and destination causes a source to perform the steps of: transmitting a message to the destination which requests an allocation of a specified number of credits from the destination, a credit manifesting a portion of memory space in the destination that has been set aside to store a received packet; updating a stored credit value at the source upon receipt of a message from the destination which grants at least some of the requested credits; and transmitting a packet or packets from the source to the destination and decrementing the stored credit value for each transmitted packet. The source also includes means for transmitting a packet debit command which returns to the destination credits that are no longer required by the source, thus enabling the destination to reallocate the debited credits to another source which wishes to communicate.

7 Claims, 2 Drawing Sheets

PACKET CONTROL PROCEDURE BETWEEN A HOST PROCESSOR AND A PERIPHERAL UNIT

FIELD OF THE INVENTION

This invention relates to data transmission between a peripheral unit and one or more connected host data processors and, more particularly, to a packetized data communication protocol that enables a peripheral unit to control the flow of incoming data from a host data processor.

BACKGROUND OF THE INVENTION

Over the past several years, data processing systems have migrated towards client-server and distributed models. As a result, more devices are today being interconnected by both local area networks and wide area networks which require various levels of bi-directional communication to allow remote configuration and monitoring of connected devices. However, many peripheral devices (e.g. laser printers, ink jet printers, plotters, etc.) still contain what are essentially unidirectional parallel and serial interfaces. The serial interfaces are bidirectional but are generally very slow. Parallel interfaces are generally unidirectional. Thus, with many prior art peripheral devices, configuration data cannot be communicated to a host via a parallel interface.

Even peripherals having a bidirectional parallel port still have a substantially constricted ability to receive configuration and other command data from a host processor. For instance, some laser printers are unable to receive a command from a host processor if a print job is in process of being printed via the parallel port. Until the print job is complete, the printer can neither receive nor respond to a control inquiry or command.

Packetizing of data allows a stream of data to be logically broken into smaller chunks in such a fashion as to enable multiple independent data streams to be transmitted over the same physical medium at the same time. This is achieved by interleaving packets of one stream with packets from another. Because address information (source and destination) is included with each packet, the packets can be successfully routed to an appropriate receiving unit.

As applied to host/peripheral communications, packets containing queries about a peripheral's state can be interleaved with packets containing peripheral data. When packets are received by the peripheral unit, address information is removed and used to route packets containing the peripheral data to a parser and packets containing queries concerning a peripheral's state to a processor which handles such inquiries. Thus, using a packetized data transmission scheme, interrogation and control of a peripheral unit are enabled to occur at almost any time during the processing of peripheral data.

When employing a packetized data flow to communicate between a host processor and a peripheral unit, the protocol must include some means for coping with the fact that the peripheral unit is generally provided with limited memory space. Further, if the peripheral unit is required to interface with a plurality of host processors, it must have some means of allocating the memory space among the competing host processors. In the prior art, the memory allocation function has been relegated to the peripheral unit so that upon determining that a host processor has a pending request to communicate, the peripheral unit allocates a certain memory size to the host processor—thereby enabling a commencement of communications. If the host processor requires additional memory space, it is required to wait for the peripheral unit to grant another block of memory space—before continuing communications. Furthermore, if the host processor completes a transmission to the peripheral unit and has not used all of the memory allocated by the peripheral unit, the host processor has no mechanism for relinquishing the unused memory space back to the peripheral unit until and unless the connection between the peripheral unit and host processor is broken.

Accordingly, it is an object of this invention to provide an improved packetized data communication procedure between a host processor and a peripheral unit.

It is another object of this invention to provide an improved packetized communication procedure wherein a source can request allocation of a specific amount of memory from a destination.

It is yet another object of this invention to provide an improved packetized communication procedure between a source and destination wherein the destination is enabled to unilaterally relinquish allocated memory space to the source.

SUMMARY OF THE INVENTION

A method for controlling packet communications between a source and destination causes a source to perform the steps of: transmitting a message to the destination which requests an allocation of a specific number of credits from the destination, a credit manifesting a portion of memory space in the destination that has been set aside to store a received packet; updating a stored credit value at the source upon receipt of a message from the destination which grants at least some of the requested credits; and transmitting a packet or packets from the source to the destination and decrementing the stored credit value for each transmitted packet. The source also includes means for transmitting a packet debit command which returns to the destination credits that are no longer required by the source, thus enabling the destination to reallocate the debited credits to another source which wishes to communicate.

Figure 1:
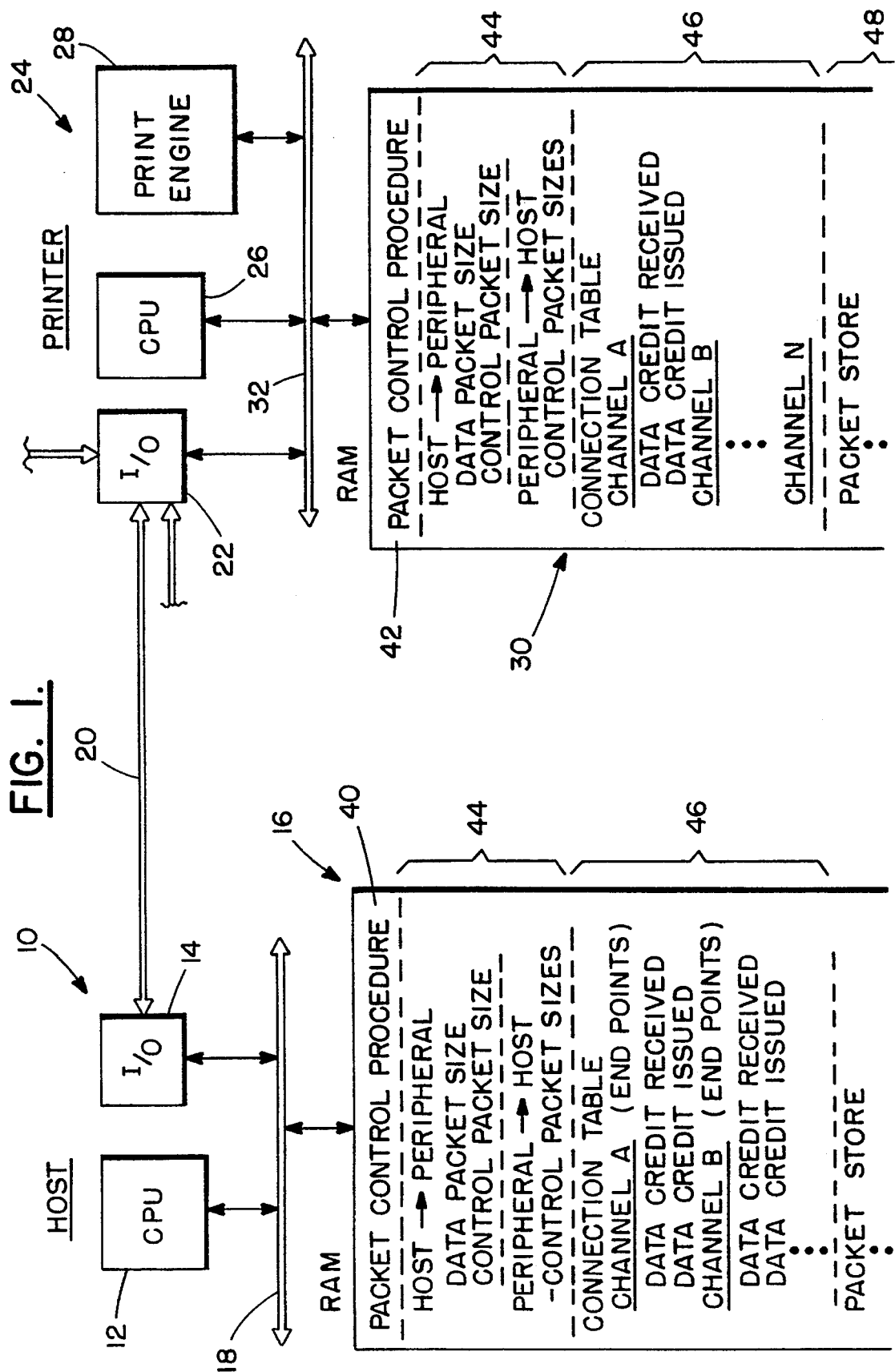
FIG. 1 is a high level block diagram illustrating a source host processor that is connected to a destination peripheral unit and employs a packet control procedure using the invention hereof.

DETAILED DESCRIPTION OF THE INVENTION.

Hereafter, the packet flow control protocol utilized by the system of FIG. 1 will be described in relation to a host computer connected to a printer. However, it is to be understood that the protocol is adaptable to any of a plurality of different peripheral units that employ packetized communication techniques. Also the protocol is adaptable to communication between host processors.

The protocol employs a master/slave relationship after initialization, i.e., the host must always initiate the dialog. After initialization, the protocol allows peer-to-peer operation in that remaining commands and replies (those not involved in initialization) may be sent from either side of a link. A flow control pacing mechanism is employed by the protocol for communication link-level control actions which follows an issue-a-request and a wait-for-reply procedure. In implementing flow control, "credits" are employed for data packets. In the context of the protocol, a credit is an indication sent by the data destination to the data source which indicates that the destination is prepared to accept X packets. One credit indicates, in general, that the destination has allocated sufficient memory to store one packet.

The maximum size for each packet is a known value at both the destination and the source or is negotiated during an initialization process for each transmission channel. The negotiation includes a setting of the size of packets in both directions. For host/printer communications, this involves setting the packet size in both the host-to-printer and the printer-to-host directions. In many cases, the packet sizes will differ with direction. For example, print data transmitted from the host computer to the printer is typically uni-directional and the amount of such data can be quite large. Thus, it is sensible to negotiate large host-to-printer packet sizes. On the other hand, queries and responses about a printer's status involve a bi-directional exchange, require very little data and thus, may be quite small.

As will be understood from the detailed description below, the data source in this protocol is provided with a command (i.e. a "credit request") that enables the source to help a destination better manage the destination's limited memory resources. By enabling the source to specify a certain number of requested credits, the destination need not arbitrarily allocate credits to the source but needs only accommodate the specifically requested number of credits (or some smaller value that is presently available for allocation at the destination). The protocol further includes a debit command which enables a source to return unused credits to a destination without requiring a link disconnect. Thus, the destination is able to reallocate the returned credits to another source seeking to communicate.

Prior to considering the details of the invention, certain terminology to be used is defined as follows:

Channel: An independently flow-controlled communications path between a host socket and a peripheral socket. A channel provides a logical conduit for moving data between two end points.

Socket: A source and/or destination, on one end of a logical data conduit to which and/or from which data may be channelled.

Credit: A value issued by a destination that indicates a number of packets the destination is able to accept.

Flow Control: A function preformed by a receiving entity to limit an amount of data that is sent by a source.

Host: A device, typically a personal computer, which controls communications with attached peripheral devices. From a peripheral's perspective, a network adapter attached to a serial or parallel port may also look like a host.

MLC: Acronym for "multiple logical channels". A packet protocol that provides multiple logical channels, independent of one another, over a single point-to-point link between two devices, with the two devices normally being a host computer and a peripheral.

Packet: A group of bits, including address, data and control elements that are transmitted together as a single entity.

Turning to FIG. 1, a host processor 10 comprises a central processing unit (CPU) 12, an input/output (I/O) module 14 and a random access memory (RAM) 16. Each of the aforementioned elements are connected by a bus 18 which enables both data and control communications therebetween. I/O module 14 is connected via a multiline cable 20 to an input/output (I/O) module 22 of a printer 24. Printer 24 is also provided with a CPU 26, a print engine 28 and a RAM 30. A bus 32 provides both data and control communications between each of the modules of printer 24.

As will become apparent, data contained within RAMs 16 and 30 bear substantial similarities in that both maintain data structures which enable a tracking of credits as between host 10 and printer 24. As indicated above, the communication protocol between host processor 10 and printer 24 employs a packetized data format. Flow control of the packets is achieved via a packet flow control procedure 40 contained with RAM 16. A similar packet flow control procedure 42 is contained within RAM 30 in printer 24. Both RAMs 16 and 30 contain a section 44 which maintains track of negotiated packet sizes for each logical channel that has been established. Thus, in host processor 10, RAM area 44 will include a value which defines the size of a data packet that is to be used to send data from host processor 10 to printer 24. It will also include a control packet size to be employed for control information sent from host processor 10 to printer 24 (and visa-versa). Similarly, RAM 16 will include stored values defining the sizes of both control and data packets.

If host processor 10 is connected to other peripheral units, area 44 of RAM 16 will also contain packet size data that has been negotiated with the other peripheral units. In a similar fashion, if host processor 10 is connected to a network (instead of a direct connection as shown in FIG. 1 ), each logical channel will have associated packet sizes stored in area 44 so as to enable host processor 10 to know how much data can be inserted in an outgoing packet and how much data is to be expected in a received packet (i.e. for memory allocation purposes).

RAM 16 and RAM 30 also include an area 46 which contains a connection table that defines each logical channel that has been established with another entity. Thus, as shown in RAM 16, channel A will include an identification of the end sockets of the channel, i.e., socket identifiers of entities comprising the channel. A further entry under channel A will include the number of data credits received from the connected entity or the number of data credits issued to the connected entity, as the case may be. Those data credits are updated by CPU 12 as they are either used or received from the other entity. Thus, the data credit values in area 46 always indicate a most updated credit value that defines either the number of packets which can be transmitted (i.e. to cause the presently accumulated data credit value to be fully debited to a zero value), or the number of data credits which have been issued to a connected entity and how many of those data credits are awaiting use at the connected entity.

RAM 16 further includes an area 48 for storage of individual packets that are assembled and ready to be transmitted or are received and buffered for further use. RAM 30 contains a similar packet store area 48.

With respect to command and reply packets, the protocol assures that each command and each reply carries with it an implied grant of a credit which means that when a command is received, the source of the command has allocated space in memory for the destination's reply. When a reply is received from the destination, it is also known that the destination is prepared to accept the source's next command.

With respect to data communications, credit operations are not implicit. Credits are issued by a destination and indicate how many data packets the destination is prepared to accept. As will be seen, credit may be issued when a connection is accepted, it may be "piggy-backed" with a data packet or it may be updated periodically using control packet exchanges between communicating devices, employing command/reply exchanges. Credits may be "piggy-backed" by employing a field in a data packet's header which indicates how many additional packet credits are being issued by the source of the packet.

When a source receives data packet credits from a destination, it can begin sending data packets at any time and can continue so long as the number of packets it sends does not exceed the credits issued by the destination. The destination may send another credit packet indicating how many additional data packets it is able to except. If the destination does not issue another set of credits, the sender may need to request additional credits. The credit system is additively cumulative. When a source receives a grant of a credit or credits, the credit or credits are added to a running total it is tracking. That running total is initially set to the credit value given in an acknowledgment when the connection is opened. As the source sends out packets, it decrements the running total of credits. As will be understood, credits can be returned by the destination requesting that the source relinquish some credits and the source agreeing to do so. Furthermore, one side can relinquish credits unilaterally if it determines that they are unneeded.

The packet control procedure employed by the invention hereof utilizes a number of commands that are described below:

MLC Init: This command begins initiation negotiations. This packet must be issued and responded to before any further MLC communications can take place.

MLC Init Reply: This command is an acknowledgment of an initialization request from a source. It indicates that the destination is available to receive packets (and implements the MLC procedure).

MLC Config Socket: This command is used to negotiate packet sizes. The command is sent after an MLC Init Reply is received by the source and identifies the size packets requested for both host-to-printer packet sizes and printer-to-host packet sizes.

MLC Config Socket Reply: This command is an acknowledgment that a socket is being configured at the destination and provides further data regarding the host-to-printer packet size and peripheral-to-host packet size. When the printer receives packet size requests from a host processor, the printer may respond by setting smaller size packets. More specifically, data transfers will adhere to the packet size as established by the printer irrespective of what the host requests—but the printer dictated packet sizes cannot be larger than that set by the host in the initial size request.

MLC Open Channel: This command is issued when one side of a communication link wishes to open a logical channel with the other side, both sides having agreed upon host-to-printer and printer-to-host packet sizes. The command includes a field for the issuance of credit.

MLC Open Channel Reply: This command acknowledges that a logical connection or channel between a host and printer has been requested and includes a value which grants a number of packet credits to the source of the MLC Open Channel command (assuming the channel is open). The initially granted credits control the number of packets that can be transmitted from the source to the destination without a grant of additional credits.

MLC Credit: The MLC protocol, to implement data pacing, provides a way for one side of the communication link to issue credits to the other side. This command, paired with the MLC Credit Reply command, implements a portion of that mechanism. It is used to issue credits for data communications.

MLC Credit Reply: This command acknowledges that credit for a particular channel has been received.

MLC Credit Request: This command is used to request a data credit from an identified socket. More specifically, this command enables a source of data to request a specific number of credits which will enable remaining data to be sent to a destination. This credit may be employed when one side of a link has a small amount of data left to send, outstanding credit having been exhausted and some amount of time has passed without additional credit being issued. This command enables a proper amount of credit to be issued by the destination and enables the destination to reserve memory space for other credit requestors.

MLC Credit Request Reply: This command is used by one side of the communication link to issue additional credits to the other side after an MLC Credit Request has been received. Whatever value is granted in the credit field of this command is added to the packet credit the recipient already has.

MLC Debit: This command is employed by one side of a communication link to return credit to the other side. More specifically, it enables a source of data to unilaterally relinquish credits previously granted (when those credits are unneeded).

MLC Debit Reply: This command acknowledges that credit for a particular channel has been returned.

MLC Debit Request: This command is a request to reclaim credit by a destination that was previously issued by the destination to the source.

MCL Debit Request Reply: This command is an acknowledgement that the MLC Debit Request command was received.

Figure 2:
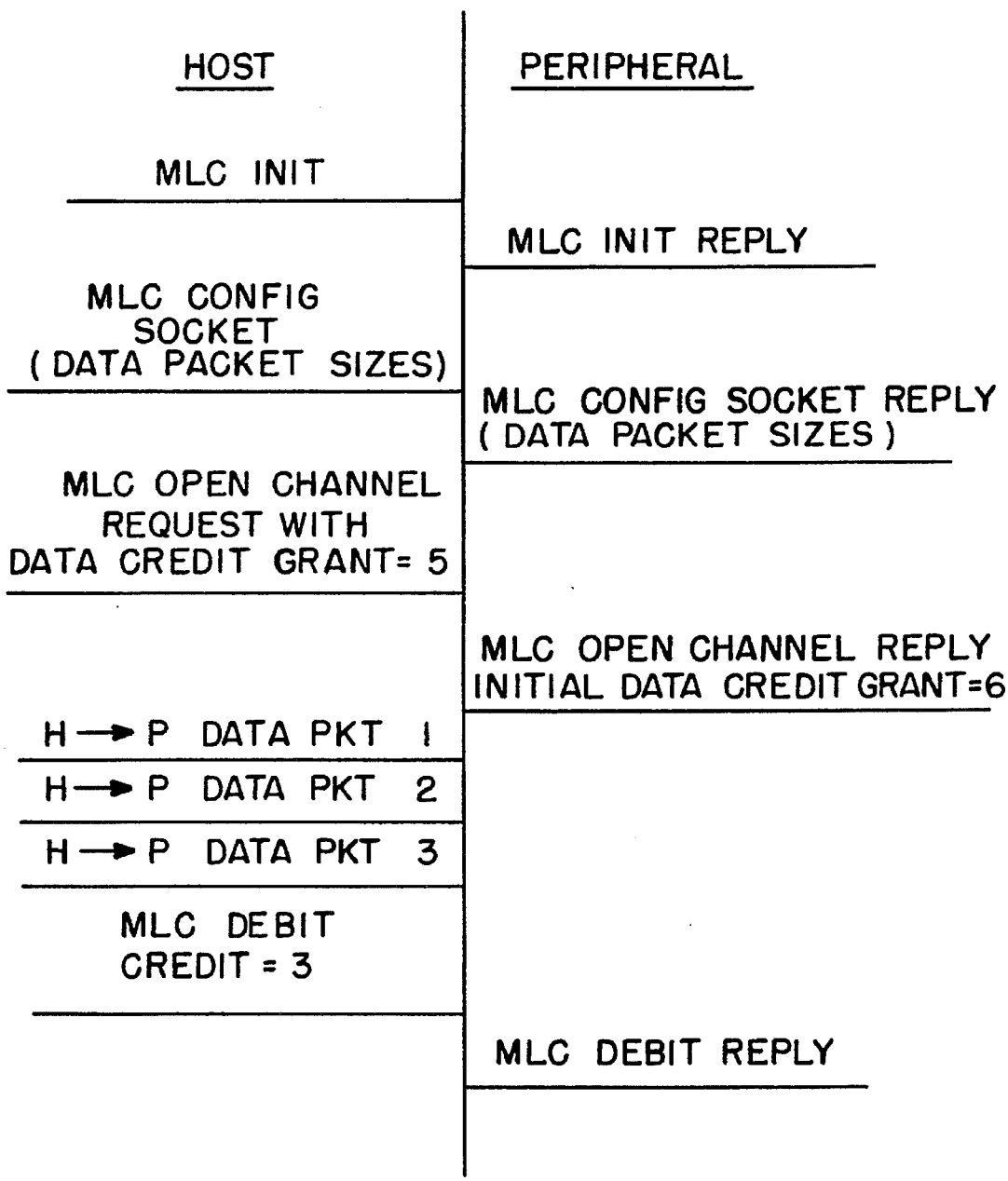
FIG. 2 is a chart illustrating certain of the commands employed to implement the packet control procedure in the system of FIG. 1.

Turning to FIG. 2, an example of the use of the above noted commands will be provided. As indicated, a logical channel communication commences when the host processor issues an MLC Init command to the printer. If the printer is configured to respond to MLC protocol packets, an MLC Init Reply is issued indicating to the host that the printer is available to receive packetized data. The host then transmits an MLC Config Socket command which specifies desired data and command packet sizes (both host-to-printer and printer-to-host). The printer responds by either agreeing with the proposed data packet size or dictating a smaller data packet size. Whatever data packet size is indicated by the printer is controlling on the host.

Upon receiving the reply, the host responds with an MLC Open Channel Request and indicates a data credit grant equal to five credits (for example) to enable the printer to respond with up to five packets. It is assumed that the printer responds with an MLC Open Channel Reply which confirms the initial data credit grant of five credits and may also issue credits to enable the host to start sending data. At this point, assuming an issuance of N credits, the host knows that it has credits to transmit N data packets. If no data credits are issued by the printer, the host must request the grant of data credits.

Assume now that data packets 1, 2 and 3 are transmitted from the host to the printer and that no further data packets are required to be transmitted. The host, through use of the MLC Debit command is now enabled to return to the printer a credit of three packets, which credit has not been used and is not needed. The printer, upon receiving the debit, issues an MLC Debit Reply and, at the same time, adds the debited credits to an accumulated value of credits that are available for grant. The peripheral may allocate the returned credits to another channel which has a request pending.

If the host has not issued an MLC Debit Credit command and a certain period of time has transpired since the transmission of data packet 3, the printer is enabled to issue an MLC Debit Request to the host requesting the return of the unused credits. Assuming the host has no further data to transmit, the host will reply with an MLC Debit Request Reply indicating that the outstanding credit has or has not been relinquished. The printer then updates its channel credit balance accordingly.

The MLC Debit command is particularly useful if a printer is running in a multiport mode. In such case, the printer can allocate small credit amounts to the sources attached to each channel to enable a start of transmission. Then, the first source that comes up and commences sending data can be allocated a large number of credits, the destination knowing that the source will return the credits if they are unused.

The command structure which enables the control of packet transmissions operates well in both an environment where most packet transmissions are unilateral or when there is substantial bilateral packet traffic. For instance, in a direct host processor-to-printer link, most data transmission is from the host processor to the printer. In such a case, the host processor must use MLC Credit Request commands to request additional credits, as return packet traffic from the printer to the host processor is sparse. Where, however, there is significant bilateral packet traffic, the use of the MLC Credit command, with included packet credit grants, is unnecessary as data packets travelling in the reverse direction will carry the necessary packet credit grants.

It should be understood that the foregoing description is only illustrative of the invention. Various alternatives and modifications can be derived by those skilled in the art, without departing from the invention. For instance, while the invention has been described in the context of a packet network, the credit handling protocol is equally applicable to any other unit of data transmission. Thus, if the data units are bytes or words, credit values can be granted in byte or word quantities rather than packet quantities. Accordingly, the present invention is intended to embrace all such alternatives, modifications and variances that fall within the scope of the appended claims.

What is claimed is:

1. A method for controlling data communications between a source and a destination, said data communications accomplished by transmission of data segments, said source performing the steps of:

(a) transmitting a message to said destination which requests an allocation of a specified number of credits from said destination, a credit manifesting a portion of memory space in said destination that has been reserved to store a data segment received from said source;

(b) updating a stored credit value at said source with a granted credit value, upon receipt of a message from said destination which includes said granted credit value, said granted credit value manifesting at least some requested ones of said specified number of credits requested by said source;

(c) transmitting a data segment or data segments and decrementing said stored credit value for each transmitted data segment;

(d) continuing transmission of data segments and decrementing of said stored credit value for each transmitted packet until said credit value reaches a threshold value; and (e) transmitting a further message to said destination requesting a further allocation of a specified number of credits from said destination if additional data segments await to be transmitted.

2. The method as recited in claim 1 wherein the said data segment is a data packet and said transmitting step (a) requests credits in an amount of a number of data packets to be transmitted.

3. The method as recited in claim 1 further comprising the steps of:

(f) transmitting data segments until all data segments have been transmitted to said destination and said credit value is not a null; and (g) transmitting a message to said destination which relinquishes at least a portion of said credit value that remains after all said data segments have been transmitted.

4. The method as recited in claim 1 wherein each data segment includes a credit data field, said credit data field enabling said transmitting step (c) to allocate credits to a source without requiring transmission of a special credit message.

5. A system for controlling communications between a source and a destination, said communication accomplished by transmission of data packets, said system comprising:

means for transmitting from said source to said destination, a control message requesting said destination to allocate N portions of memory space to receive N data packets from said source, where $N \geq 1$;

source memory means;

means at said source responsive to receipt of a control message from said destination that indicates an allocation of at least some said N portions of memory, to update a stored value in said source memory means of previously allocated portions of memory, if any, from said destination so as to reflect said allocation;

means for transmitting from said source to said destination, a number of data packets, said number equal to or less than said stored value of allocated portions of memory from said destination;

means at said source, responsive to all data packets destined for said destination having been transmitted and said stored value in said source memory means manifesting an unused portion or portions of memory previously allocated by said destination, to transmit a message to said destination relinquishing said unused portion or portions of memory previously allocated; and means at said destination for reallocating to another source, a relinquished unused portion or portions of memory.

6. The system as recited in claim 5, wherein said message relinquishing said unused portion or portions of memory is transmitted to said destination unilaterally by said source without requiring receipt of a request for said relinquishing from said destination.

7. The system as recited in claim 5, wherein said source further includes means for automatically allocating a portion of memory space to receive a control message from a destination in response to a control message transmitted to said destination by said source.

* * * * *